United States Patent [19]

Matsuoka et al.

[11] Patent Number: 5,257,322
[45] Date of Patent: Oct. 26, 1993

[54] METHOD AND APPARATUS FOR PATTERN RECOGNITION AND DISPLAY WITH OPTICAL CORRELATOR

[75] Inventors: Katunori Matsuoka, Toyonaka; Kazuo Ohtani, Ikeda; Hironobu Okuyama, Nara, all of Japan

[73] Assignee: Agency of Industrial Science and Technology, Tokyo, Japan

[21] Appl. No.: 827,526

[22] Filed: Jan. 29, 1992

Related U.S. Application Data

[63] Continuation of Ser. No. 584,674, Sep. 19, 1990.

[30] Foreign Application Priority Data

Sep. 20, 1989 [JP] Japan .................. 1-245756

[51] Int. Cl.$^5$ .............................................. G06K 9/76
[52] U.S. Cl. .................................. 382/31; 382/11; 382/42; 359/561
[58] Field of Search .............. 382/31, 42, 11; 359/11, 359/559–561

[56] References Cited

U.S. PATENT DOCUMENTS 4,961,615 10/1990 Owechko et al. ............ 350/162.13

OTHER PUBLICATIONS

Projection synthetic discriminant function performance; Optical Engineering; Nov./Dec. 1984, vol. 23 No. 6.
Optical associative memory using Fourier transform holograms; Optical Engineering; May 1987, vol. 26 No. 5.

Primary Examiner—David K. Moore
Attorney, Agent, or Firm—Armstrong, Westerman, Hattori, McLeland & Naughton

[57] ABSTRACT

A pattern recognition method and apparatus wherein an optical correlator and a feedback light path are provided. In the optical correlator, an input pattern whose image is formed on a first spatial light modulator (valve) is read by the irradiation of coherent light, and an image of a correlation peak image of this reading light is formed by the use of a correlation filter on which a plurality of reference patterns are recorded in the form of modified patterns. In the feedback light path, the correlation peak image is formed on a second spatial light modulator (valve), the correlation peak image is read out by the irradiation of coherent light, and the light having read the correlation image is made to pass a display filter on which display reference patterns are recorded. Further, an optical system is provided for feeding back the coherent light to the optical correlator after the coherent light having passed the display filter is once formed, thereby reading the correlation peak image by a light intensity measuring device. Moreover, there is disclosed a pattern displaying method and apparatus wherein the feedback light from the feedback light path is formed on a displaying member.

4 Claims, 3 Drawing Sheets

METHOD AND APPARATUS FOR PATTERN RECOGNITION AND DISPLAY WITH OPTICAL CORRELATOR

This application is a continuation of application Ser. No. 584,674 filed Sep. 19, 1990.

BACKGROUND OF THE INVENTION

1. Field of the Invention

This invention relates to a pattern recognition apparatus and to a pattern display apparatus each using an optical correlator.

2. Description of the Prior Art

Figure 1:
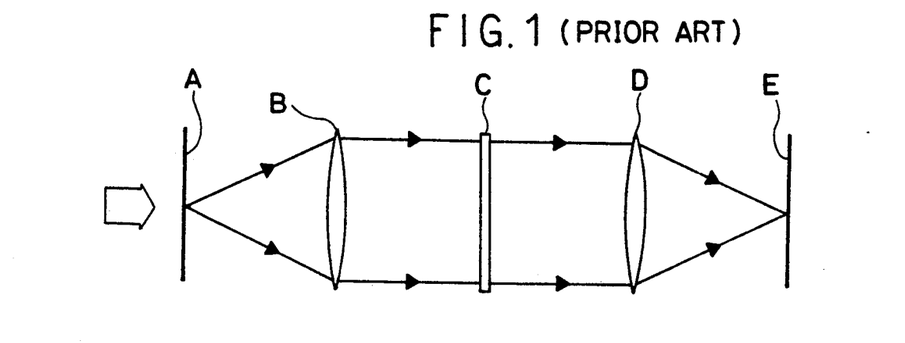
FIG. 1 is an explanatory view showing schematically a conventional pattern recognition apparatus.

Conventionally, optical pattern recognition has been carried out by the use of a Vander Lugt type optical correlator such as shown in FIG. 1 of the accompanying drawings. This method uses an apparatus in which a correlation filter C is equipped with reference patterns each exhibiting a correlation peak to an input of a specific pattern and in which an input pattern A, a first lens B, the correlation filter C, a second lens D, and an output plane E are arranged in this order, on the focal planes of the lenses. The apparatus judges whether or not the input pattern A is an intended pattern by judging whether the correlation peak value on the output plane is greater or smaller than a predetermined value when the input pattern A is inputted. Furthermore, by the apparatus pattern recognition can be made by finding out the greatest correlation peak value amount the correlation peak values corresponding to the input pattern by the use of a correlation filter having a plurality of reference patterns prepared by multiplex recording and then recording the pattern corresponding to the greatest correlation peak value.

In accordance with the method described above, however, the correlation peaks cannot always be normalized for some input patterns. Therefore, the greatest peak value must be found by a computer or the like in order to make pattern recognition, and the real time operation is difficult.

The same problem occurs in the case of display of a recognized pattern in accordance with this method because the display is based on the prerequisite that the greatest peak value described above is to be found out.

For example, in "OPTICAL ENGINEERING", vol. 26, No. 5 (May 1987), pages 428–433, Eung Gi Paek & Demetri Psaltis, "Optical associative memory using Fourier transform holograms", a method is proposed which improves detection accuracy by recognizing an input pattern optically with an optical correlator, displaying the recognized pattern optically in the form of a reference pattern, and by feeding back this recognition signal to the optical correlator.

However, the method of this prior art described in the above quoted reference involves the problem in that, for example, pattern recognition with sufficiently high detection accuracy cannot be made for input patterns having low degree of correlationship.

SUMMARY OF THE INVENTION

It is an object of the present invention to provide a pattern recognition method and apparatus which solves the problems in the prior art technique described above, does not need the finding processing of the greatest peak value when pattern recognition and display are made, but can easily execute real time operation.

It is another object of the present invention to provide a pattern display method and apparatus for displaying the pattern which is recognized without finding the greatest peak search.

It is still another object of the present invention to provide a pattern recognition method and apparatus which increases the intensity of the light signals circulating through the optical correlator and a feedback optical system, can detect with high detection accuracy even those input patterns, such as highly individual hand-written characters, which have a low degree of correlationship with reference characters, and can moreover display a character, for example, a Chinese character (kanji) "花" (a vase) by optical means when a picture of a vase is recognized.

The pattern recognition method of the present invention for accomplishing the objects described above comprises:

i) forming an image of an input pattern on a first spatial light modulator (valve);

reading out the image on the spatial light modulator (valve) by the irradiation of coherent light;

making a plurality of correlation peak images of light intensity corresponding to the degree of correlationship between the image read out and a plurality of reference patterns by the use of an optical correlator equipped with a first lens, a correlation filter having the reference patterns and a second lens so as to obtain a correlation image by Fourier transform of the light used for reading out the image of the input pattern;

forming the correlation peak images on a second spatial light modulator (valve) operating with nonlinear response, namely, producing an output so that the differences between input values may be increased exaggeratingly;

reading out the image on the second spatial light modulator (valve) by the irradiation of coherent light;

displaying the image of a display pattern on the basis of the light from the correlation peak image by a feedback light path equipped with a third lens, a display filter having predetermined display patterns, and a fourth lens so as to obtain an image by Fourier transform of light after the read-out;

returning the light which having passed through the feedback light path to the optical correlator by reflecting means and feeding it back to the optical correlator and to the feedback light path while adjusting the intensity of the read-out light returned to the first spatial light modulator (valve) so that the sum of the optical intensities of the correlation peak images becomes substantially constant;

using, as the correlation filter, a filter on which reference patterns prepared by combining a plurality of filter preparation patterns having predetermined correlation are arranged on the correlation filter;

using, as the display filter, a filter having one of the filter preparation patterns used for making the reference patterns by synthesizing in correspondence with the arrangement of the reference pattern; and reading out the light intensity in the position corresponding to each of the reference patterns by an optical intensity detector with respect to the correlation peak image obtained by the optical correlator.

The pattern display method of the present invention is one which displays the image obtained by the feedback light path on the basis of the feedback light described above.

The pattern recognition apparatus in accordance with the present invention comprises:

ii) an image formation section for forming the image of an input pattern on the first spatial light modulator (valve);

a first light source for reading out the image on the first spatial light modulator (valve) by the irradiation of coherent light;

an optical correlator for obtaining a correlation image of a light intensity corresponding to the correlationship between the image read out and a plurality of reference patterns by Fourier transform of the light from the light source passing through the first spatial light modulator (valve);

a second spatial light modulator (valve) disposed in the image formation position of the correlation image and exhibiting non-linear response, namely, producing an output so that the difference between the input values may be exaggeratingly increased;

a second light source for reading out the image on the second spatial light modulator (valve) by the irradiation of coherent light;

a feedback light path for forming a predetermined pattern on the basis of light read out from the second spatial light modulator (valve);

reflecting means for returning the light which has passed through the feedback light path to the optical correlator; and a controller for detecting the light intensity of the correlation images inputted to the second spatial light modulator (valve) and adjusting the intensity of the read-out light of the first spatial light modulator (valve) so that the sum of the light intensity becomes substantially constant; wherein:

the optical correlator includes a first lens, a correlation filter having the plurality of reference patterns and a second lens so as to obtain the correlation image of the light used for reading out the image of the input pattern;

the feedback light path includes a third lens, a display filter and a fourth lens so as to obtain the image by Fourier transform of the read-out light from the second spatial light modulator (valve);

the plurality of reference patterns of the correlation filter are prepared by combining filter preparation patterns having respectively predetermined relations and are arranged on the correlation filter; and the display filter is equipped with one of the filter preparation patterns used for synthesizing each of the reference patterns in correspondence with the arrangement of the reference pattern; and wherein:

the pattern recognition device further includes a light intensity detector for reading out the light intensity in the position corresponding to each of the reference patterns with respect to the correlation image obtained by the optical correlator.

The pattern display apparatus of the present invention is featured by including a display portion for displaying the image of the feedback light path described above.

In each of the methods and apparatuses described above, it is desirable that the spatial light modulator (valve) be disposed on the focal plane of the first lens on the input pattern side, the correlation filter be disposed on the focal planes of the first and second lenses between these lenses, and the display filter be disposed on the focal planes of the third and fourth lenses between these lenses. According to this arrangement, Fourier transform and inverse Fourier transform of the light used for reading out the input pattern can be made accurately, and accordingly pattern recognition and pattern display can be made accurately.

The reference patterns are not of one kind of patterns. They include ordinary variation patterns of specific characters and figures or graphics so that recognition of a higher degree of correlationship can be made.

DESCRIPTION OF THE PREFERRED EMBODIMENTS

Hereinafter, the preferred embodiments of the present invention will be explained with reference to the accompanying drawings.

Figure 2:
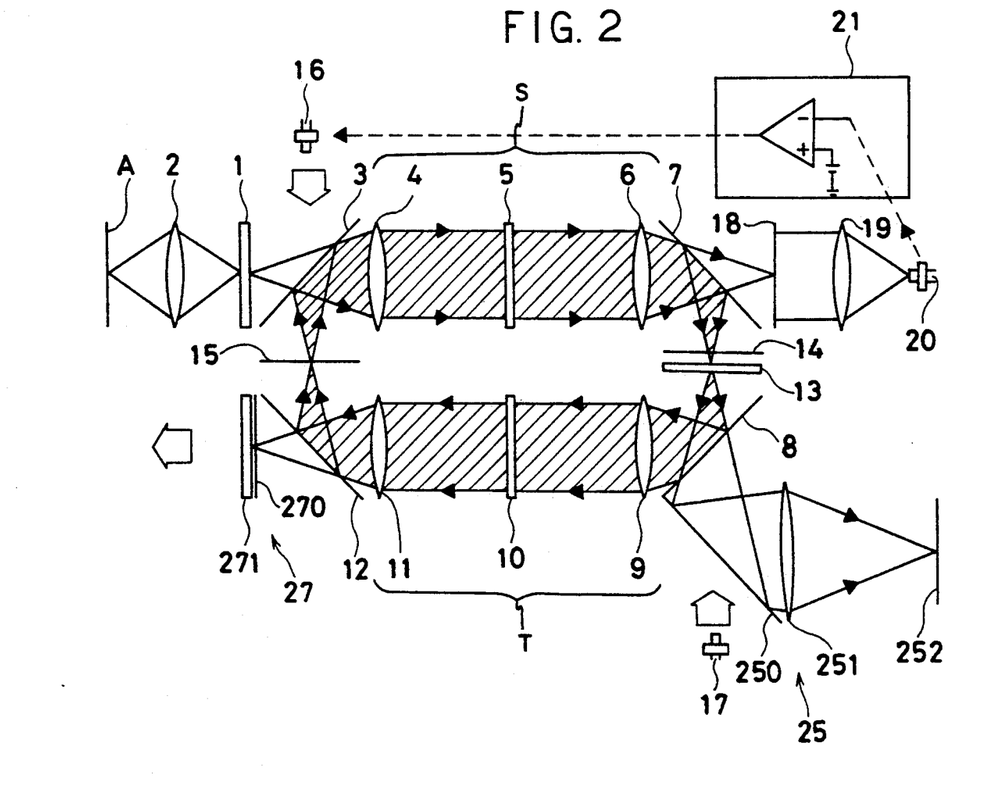
FIG. 2 is an explanatory view showing schematically an example of the apparatus of the present invention.

FIG. 2 shows schematically an example of the apparatus in accordance with the present invention. This apparatus is equipped with a liquid light valve 1 as a spatial light modulator (valve) and an image forming lens 2 for forming the image of an input pattern A on the liquid light valve 1. An optical correlator is disposed on the opposite side to the image forming lens 2 with respect to the liquid light valve 1.

A liquid light valve which has been used conventionally is used as the liquid light valve 1. In other words, this valve has the structure wherein an image receiving layer whose electric conductivity changes with light intensity, a dielectric mirror layer, and a liquid crystal layer are laminated. A power source voltage is applied to this laminate structure so that the input pattern is formed on the image receiving layer. The voltage in accordance with brightness of the image formed is applied to the liquid crystal layer, and the light transmission power of the liquid crystal layer is varied in accordance with the light intensity of the image formed on the image receiving layer. Accordingly, when read-out coherent light is irradiated onto the liquid crystal layer, the reflected light having the intensity in accordance with the light intensity of the image can be obtained through the liquid crystal layer.

The optical correlator S comprises the first lens 4, the correlation filter 5 and the second lens 6, while the feedback light path T comprises the third lens 9, the display filter 10 and the fourth lens 11.

The liquid crystal light valve 1 is positioned on the focal plane of the first lens 4 on the input pattern side and the correlation filter 5 is positioned on the focal planes of the first and second lenses 4 and 6 between them. The half mirror (polarizing beam splitter) 3 is interposed between the liquid crystal light valve 1 and the first lens 4, and the half mirror 7, is between the second lens 6 and the focal plane of the second lens. A feedback light path T is disposed in parallel with the optical correlator.

The feedback light path T is equipped with a half mirror 8, a third lens 9, a display filter 10, a fourth lens 11 and a half mirror 12 in this order.

The display filter 10 is positioned on the focal planes of the third and fourth lenses 9 and 11 between them, and the half mirrors 8 and 12 are positioned between the third and fourth lenses 9, 11 and their focal planes, respectively.

The half mirror (polarizing beam splitter) 3 is adjacent to the half mirror 12, and the half mirror 7, to the half mirror 8. They are disposed in such a manner as to reflect and feedback light passing through the optical correlator S and the feedback light path T.

The second and third lenses 6 and 9 are spaced apart from each other by the distance which is equal to the sum of their focal lengths. A liquid crystal light valve 13 is disposed on their common focal plane as a spatial light modulator (valve) and a mask 14 is disposed on its optical correlator side.

Similarly, the first and fourth lenses 4 and 11 are spaced apart from each other by the distance which is equal to the sum of their focal lengths. A mask 15 is disposed on their common focal plane.

The light valve 13 has non-linear response so that the difference of the input values is expanded in the output values.

A light source 16 for reading out the input pattern is disposed in such a manner as to irradiate light vertically to the axis of the optical correlator S to the half mirror 3 (polarizing beam splitter). A light source 17 for reading out the image on the liquid crystal light valve 13 is disposed so as to irradiate light vertically to the axis of the feedback light path to the half mirror 8. The light sources 16 and 17 emit parallel rays of light having high coherence, such as laser beams.

The correlation filter 5 is the one that is used for an ordinary Vander Lugt type optical correlator, and is produced by a hologramic method based on SDF (synthetic discrimination function) method, for example. This SDF method is described in D. Casasent, W. Rozzi, D. Fetterly, "Projection synthetic discriminant function performance" (Optical Engineering, vol. 23, No. 6, pages 716-720, 1984), for example.

The correlation filter 5 is equipped with a plurality of reference patterns prepared in accordance with predetermined standards and these reference patterns are disposed in a suitable arrangement such as a grid-like or radial arrangement. As an example of pattern recognition of alphabetic characters, this embodiment uses the reference patterns prepared by synthesizing various similar shapes of the alphabetic characters [a], [b], [c], [k], [m], [o], [s], [t] and [u] and by disposing them in the grid form of three rows by three columns.

In other words, as each pattern of the reference filter 5, A, *A*, a, gothic letter and various other types and ordinary handwritten letters are synthesized as the similar shape of the letter "a", for example. In this manner, detection accuracy of the input pattern "a" of any form of letter can be improved.

Figure 3:
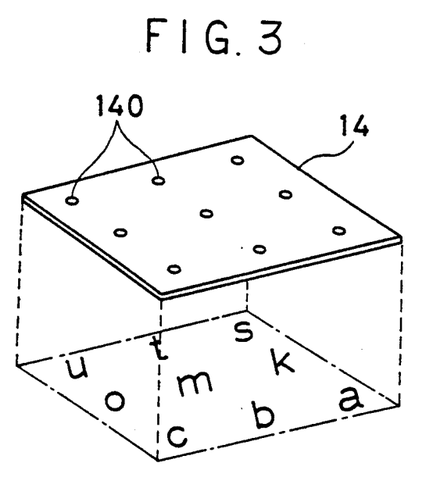
FIG. 3 is a perspective view of the mask which is used in the apparatus shown in FIG. 2.

The mask 14 is equipped with small holes 140 which are disposed in such a manner as to correspond to the arrangement (represented by one-dot-chain line in FIG. 3) of the reference pattern in the correlation filter 5 as shown in FIG. 3. These small holes are disposed so as to pass only the correlation peak portions obtained from each reference pattern among the outputs obtained by determining the correlation but so as to cut off the peripheral portions. In this manner, only the necessary correlation peaks can be extracted efficiently. If the existence of the peripheral portions does not render any problem, however, the mask 14 can be omitted.

The display filter 10 is equipped with the pattern which is to be displayed in association with the assumed input pattern as the display pattern. The reference pattern described above is prepared by synthesizing this display pattern as one of the filter preparation patterns. In the case of the filter of this embodiment for the pattern recognition and display of an alphabetic character, types [a], [b], . . . [u], for example, are employed as the display pattern.

The mask 15 is equipped with a light transmissive portion at the central part (the area whose center is the optical axes of the optical correlator and feedback light path). This mask 15 is for passing only the optical signal obtained at the center among the indication images obtained through the feedback light path.

In this embodiment, a mask 18 is disposed on the focal plane on which the light passing through the second lens 6 of the optical correlator passes further through the half mirror 7 and forms an image, and a condensing lens 19 and a photodiode 20 are disposed at the back of it. The mask 18 is of the same type as the mask 14 juxtaposed with the liquid crystal light valve 13. The output terminals of the photodiode 20 are connected to a power source control section of the light source 16 for reading out the input pattern through an operational amplifier 21.

The photodiode 20 outputs a signal in accordance with the light reception quantity to the operational amplifier 21, and the operational amplifier 21 outputs a control signal to the control section of the light source 16 so as to offset the increase and decrease of the output of the photodiode 20. In this manner, the gradual increase of the light quantity due to the addition of the input light from the light source for reading to the feedback light from the optical system is restricted.

In the pattern recognition apparatus in accordance with the present invention, the apparatus described above (hereinafter referred to as the "basic optical system") is provided with a recognition output portion 25.

The recognition output portion 25 includes a half mirror 250 for directing the light from the liquid crystal light valve 13 due to the read-out light source 17 to the outside of the system, a lens 251 for forming the image by the light thus directed and an indication member 252 placed on the image formation plane.

Besides a screen on which characters or the like corresponding to the reference patterns are disposed, suitable displaying means can be used as the display member 252 such as means which disposes photodiodes in matrix and indicates electrically the formed image.

The pattern recognition method in accordance with the present invention is conducted in the following manner by the use of the pattern recognition apparatus having the construction described above. First of all, the input pattern (such as the hand-written letter [c]) is placed at a predetermined position for the lens 2 as shown in FIG. 2 and its image is formed on the liquid crystal light valve 1. In this state a laser beam is irradiated from the read-out light source 16 to the half mirror (polarized light beam splitter) 3. The light reflected by the half mirror (polarized light beam splitter) 3 reads out the image of the liquid crystal light valve 1 and reaches the half mirror 7 through the half mirror (polarized light beam splitter) 3, the first lens 4, the correlation filter 5 and the second lens 6. At this time, the light which is subjected to Fourier transform when it passes through the first lens 4 passes through the correlation filter 5 and is again subjected to the Fourier transform by the second lens 6. It is then reflected by the half mirror 7 and forms the image on the liquid crystal light valve 13. This optical signal turns into another optical signal having a peak value in accordance with the degree of correlationship between the input pattern and each reference pattern. At this time, the mask 14 cuts off the peripheral portion of each peak value.

Figure 4:
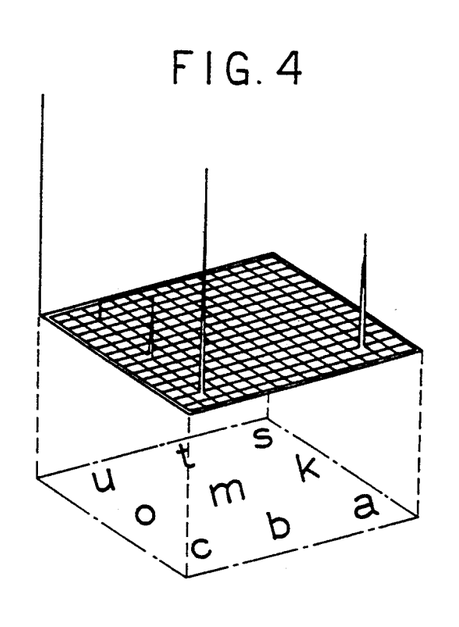
FIG. 4 is a diagram showing the peak values of outputs when input light makes the first passing through an optical correlator.

As shown in FIG. 4, for example, the correlation peak image exhibits the highest optical intensity peak value at the position [c] of the reference pattern (represented by one-dot-chain line in the drawing), the medium optical intensity peak values at the positions [a] and [o] and the small optical intensity peak values at the positions [u] and [b]. The laser beam emitted from the read-out light source 17 passes through the half mirror 8, reads out the image on the liquid crystal light valve 13 and reaches the half mirror 12 through the half mirror 8, the third lens 9, the display filter 10 and the second lens 11. At this time, the beam which is subjected to the Fourier transform by the third lens 9 passes through the display filter 10, is again subjected to Fourier transform by the fourth lens 11 and forms a visible image. One of the displayed images is obtained on the focal plane of the fourth lens 11 through the half mirror 12. This image is formed by the correlation peak obtained by the optical correlator and is expressed by the synthesis of the display patterns having the optical intensity in accordance with the correlation peak values. In other words, the character [c] is the brightest and the characters [a], [o], [b] and [u] become darker in this order. These characters appear at the central part (the area whose center is the optical axis of the feedback light path as the center) and the light of the peripheral portions is cut off by the mask 15. The beam which forms the image reaches intact the half mirror (polarized light beam splitter) 3 of the optical correlator, is reflected by it, and again passes through the optical correlator and the feedback light path. (Hereinafter, the light returned from the feedback light path will be referred to as the "feedback light").

Figure 5:
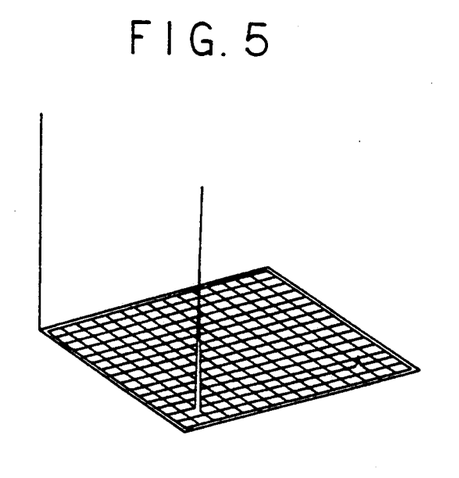
FIG. 5 is a diagram showing the peak values of the outputs from the optical correlator after the input light is fed back to an optical system.

This feedback light is mixed with the incident light from the light source 16 which is irradiated consecutively. The feedback light passes through the correlation filter and the display filter and expresses most strongly the reference pattern itself having the highest correlationship with the input pattern [c] (more accurately, [c] itself used for the preparation of the reference pattern). Accordingly, when the light as the mixture of the feedback light and the incident light from the light source 16 passes through the correlation filter 5, it exhibits a higher correlation peak value for the reference pattern [c] than the peak value of its previous passage and lowers the correlation peak values for other reference patterns. Therefore, the image of the light passing through the feedback light path exhibits the display pattern of the character [c] more strongly than the previous time and further enhances the correlation peak value of [c] after passing through the correlation filter 5. As feedback is repeated in this manner, the correlation peak value of the reference pattern [c] is enhanced while the correlation peak values of the other reference patterns are reduced. When the image of the liquid crystal light valve 13 is read out in this state by the output portion 25, the output shown in FIG. 5 can be obtained. In this way, the extremely high peak which is normalized appears in the position of the reference pattern having the highest degree of correlationship with the input pattern in the output portion 25 and the peaks in the other positions become negligible. If a suitable reference value is set, therefore, the input pattern can be immediately distinguished, without comparing the peak values.

The pattern display apparatus in accordance with the present invention is provided with a display output section 27 in the basic optical system described above. The section output portion 27 includes a mask 270 having the same light transmission portion as that of the mask 15 and a suitable display member 271 such as a liquid crystal light valve or a screen. The display member 271 is disposed on the focal plane of the fourth lens 11 through the half mirror 12, and the mask 270 is disposed just before the display member 271.

The pattern display method of the present invention is conducted in the following way by the use of the pattern display apparatus having the construction described above. Its sequence and the function brought forth by feedback of light inside the optical system are the same as those of the pattern recognition method described above. In other words, only the correlation peak value corresponding to the reference pattern having a high degree of correlationship becomes high with feedback of light in the optical correlator and in the feedback light path, and the light after passing the display filter forms the image which exhibits strongly only the corresponding display pattern. Accordingly, the light after passing through the half mirror 12 forms clearly on the display pattern on the display output portion 27.

The following is an example of the application of the embodiment described above. Namely, all the alphabetic characters are recorded on the pattern on the correlation filter 5 and the display filter 10 by the method described before, and a CCD is fitted to the display member 252 of the recognition output portion 25. Then, processing is made by a computer and the recognized characters are printed out by a printer, so that the pattern recognition portions can be processed optically. Accordingly, computer processing can be simplified and moreover, even a hand-written text can be converted to the printing style for duplication. If the read content is stored in the computer, edition can be made by use of a word processor and there can thus be provided a high level character reader.

Besides the pattern display of the same shape as the input pattern, the pattern indication apparatus and method described above can make the following display, too. The reference pattern is prepared by synthesizing various forms of the assumed input patterns, and the shapes and forms deviated from similarity of these various shapes and forms are contained as one of the shapes and forms at the time of preparation of the reference pattern. In this manner, display of a pattern (e.g. character) whose type is different from that of the input pattern (e.g. figure) can be made. In this case, too, the optical signals fed back in the optical system have the type of one element itself of the preparation of the reference pattern. Therefore, it can increase the correlation peak value of only the specific reference pattern while it is fed back repeatedly, and can clearly display only the display pattern corresponding thereto.

The above will be explained definitely. FIGS. 6A to 6D are drawings useful for explaining the case where the four patterns of an inequilateral triangle, a thin necked vase, a quadrangle and an ellipse are indicated by the corresponding Japanese letters "三角", "花瓶", "四角" and "円" as shown in FIGS. 7A to 7D by the use of the apparatus shown in FIG. 2. In other words, the hologram patterns of the four kinds of graphic patterns are all stored in the correlation filter 5 used in this application example. As to "三角" (triangle) for example, various kinds of ordinary triangular patterns and the hologram pattern of Japanese characters "三角" are recorded. As to "花瓶" (vase), various kinds of patterns of vases having typical shapes and characters "花瓶" of the Japanese letter are recorded.

Figure 6A:
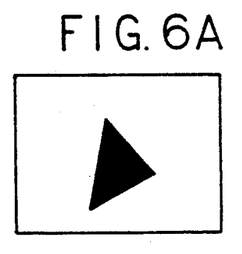
FIGS. 6A to 6D show examples of input patterns in other embodiments, respectively.
Figure 6B:
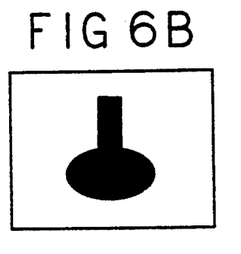
Figure 6C:
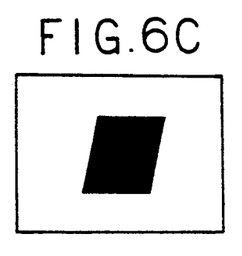
Figure 6D:
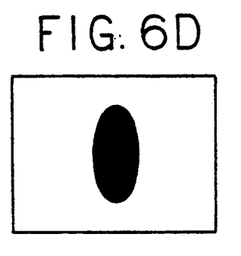
Figure 7A:
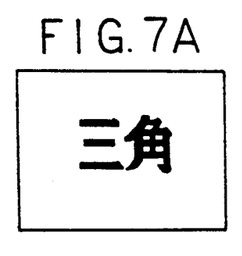
FIGS. 7A to 7D show examples of display patterns of the input patterns shown in FIGS. 6A to 6D, respectively.
Figure 7B:
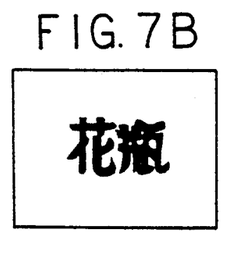
Figure 7C:
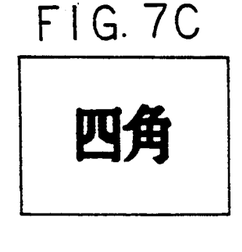
Figure 7D:
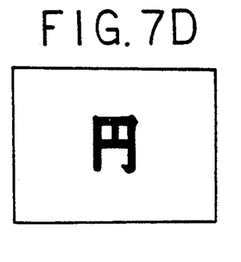

According to this method, when a suitable figure such as the pattern of FIG. 6A, for example, is disposed at the position of the input pattern A of FIG. 2, the Japanese characters "三角" (triangle) are displayed at the display output portion of the display output portion 27 of FIG. 2. Therefore, the graphic input pattern can be converted to the characters or the like without using any computer, and accordingly the construction of the apparatus can be simplified. Such an application can be utilized in a large number of fields such as teaching materials for character education, foreign language education and other learning purposes, and a copying machine for converting hand-written characters to font characters, and so forth.

Though the embodiment described above uses the half mirrors, the half mirrors can be replaced with mirrors without rearward light transmission when the output section for recognition or for display need not be disposed at the rear of the half mirror. Besides the positions of the mirrors in the embodiment described above, the positions may be available between suitable optical elements in the basic optical system.

As is obvious from the description given above, the method and apparatus of the present invention provides the following effects.

In the pattern recognition method in accordance with the present invention, the input light from the input pattern is fed back to the optical correlator and the feedback light path. Therefore, the output light from the optical correlator is normalized to a predetermined value for only the specific reference pattern, but the intensity of the output light of the other reference patterns is greatly reduced, so that a clear difference occurs in the intensity of the output light between the specific reference pattern and the other reference pattern. Accordingly, once a reference value of the optical intensity is set, various input patterns can be discriminated immediately in the same way without comparing the output peak values with one another.

In the pattern indication method in accordance with the present invention, the light intensity of the reference patterns other than a particular reference pattern are remarkably lowered by the feedback of light described above. Therefore, when the image formed from the feedback light path is displayed, only the specific display pattern can be indicated clearly without applying any particular processing.

The pattern recognition apparatus and pattern display apparatus in accordance with the present invention are equipped with the constituent elements necessary for the pattern recognition method and pattern display method described above, and each of the methods described above can be practiced rationally by the use of the apparatuses.

In accordance with the method and apparatus of the present invention described above, read-out or display can be made immediately without the necessity for searching for the output light having the highest optical intensity, and real-time processing can therefore be made extremely easily.

Furthermore, the present invention makes it possible to assist visual education or language learning, classification and assortment of bills, conversion of characters in hand-written texts to types for copying the texts, and so forth. Accordingly, the construction of the apparatus can be more simplified than the conventional apparatuses using a computer for these processings.

While the invention has been particularly shown and described in reference to preferred embodiments thereof, it will be understood by those skilled in the art that changes in form and details may be made therein without departing from the spirit and scope of the invention.

What is claimed is:

1. A pattern recognition method comprising the steps of:

forming an input pattern, such as a letter or picture, on a first spatial light modulator;

irradiating coherent light to the first spatial light modulator and thereby reading out the inputted pattern;

forming a correlation pattern between the inputted pattern and an array including a plurality of reference patterns preparatively stored in a correlation filter by a first optical correlator including the correlation filter and first and second lenses, the plurality of reference patterns being in several subgroups, each containing more than one pattern which represent the same letter or picture;

forming the formed correlation pattern in a second spatial light modulator having a non-linear input-output response characteristic for magnifying differences among a plurality of inputted values;

reading out by coherent light the non-linearly transformed correlation pattern formed on the second spatial light modulator;

correlating together an array including a plurality of display patterns preparatively stored in a display filter and the correlation pattern read out from the second spatial light modulator, using a second optical correlator including the display filter and third and fourth lenses;

feeding back the light passed through the second optical correlator to the first optical correlator and mixing the fed-back light with the read-out light of the inputted pattern;

detecting a sum of the light intensities of the correlation pattern formed by the first optical correlator and adjusting the intensity of the coherent light to be irradiated to the first spatial light modulator so that the sum of the light intensities can always be substantially constant; and detecting the position of a strongest optical peak of the correlation pattern appearing on the second spatial light modulator by the light read out by the coherent light and thereby determining the correspondence of the input pattern to a reference pattern, wherein the step for forming a correlation pattern includes the step of storing in the correlation filter Fourier transforms of the plurality of reference patterns in the array, each of the plurality of reference patterns including a plurality of patterns having a display pattern which form a sub-group for identifying a pattern category and form on a predetermined position on the input plane of the second spatial light modulator a bright correlation peak for each pattern category, and wherein the correlating step for forming a display pattern includes the step of storing in the display filter Fourier transforms of display patterns in the array included in the sub-group representing each pattern category, the array of display patterns converting each bright correlation peak formed by the correlation filter on the output plane of the second spatial light modulator to said display pattern included in the pattern category represented by the position of the correlation peak.

2. A pattern display method comprising the steps of:

forming an input pattern such as a letter or picture, on a first spatial light modulator;

irradiating coherent light to the first spatial light modulator and thereby reading out the inputted pattern;

forming a correlation pattern between the read-out pattern and an array including a plurality of reference patterns preparatively stored in a correlation filter by a first optical correlator including the correlation filter and first and second lenses, the plurality of reference patterns being in several sub-groups, each containing more than one pattern which represent the same letter or picture;

forming the formed correlation pattern on a second spatial light modulator having a non-linear input-output response characteristic for magnifying differences among a plurality of inputted values;

reading out by coherent light the non-linearly transformed correlation pattern formed on the second spatial light modulator;

correlating together an array including a plurality of display patterns preparatively stored in a display filter and the correlation pattern read out from the second spatial light modulator, using a second optical correlator including the display filter and third and fourth lenses;

feeding back the light passed through the second optical correlator to the first optical correlator and mixing the fed-back light with the read-out light of the inputted pattern;

detecting a sum of the light intensities of the correlation pattern formed by the first optical correlator and adjusting the intensity of the coherent light to be irradiated to the first spatial light modulator so that the sum of the light intensities can always be substantially constant; and displaying the display pattern obtained by the second optical correlator, wherein the step for forming a correlation pattern includes the step of storing in the correlation filter Fourier transforms of the plurality of reference patterns in the array, each of the plurality of reference patterns including a plurality of patterns having a display pattern which form a sub-group for identifying a pattern category and form on a predetermined position on the input plane of the second spatial light modulator a bright correlation peak for each pattern category, and wherein the correlating step for forming a display pattern includes the step of storing in the display filter Fourier transforms of display patterns in the array included in the sub-group representing each pattern category, the array of display patterns converting each bright correlation peak formed by the correlation filter on the output plane of the second spatial light modulator to said display pattern included in the pattern category represented by the position of the correlation peak.

3. A pattern recognition apparatus comprising:

means for imaging an input pattern, such as a letter or picture, on a first spatial light modulator;

lighting means including a first light source for radiating coherent light and reading out the input pattern imaged on the first spatial light modulator;

a first optical correlator for obtaining a correlation pattern of the read-out pattern on the first spatial modulator and a reference array of a plurality of reference patterns;

a second spatial light modulator having a non-linear input-output response characteristic and putting out a difference among input values in magnification;

another lighting means including a second light source for radiating coherent light and reading out the non-linearly transformed correlation pattern on the second spatial light modulator;

a second optical correlator for correlating together a display array including a plurality of display patterns and the read-out correlation pattern from the second spatial light modulator;

feedback means for feeding back the light passed through the second optical correlator to the first optical correlator and mixing the fed-back light with the read-out light of the input pattern;

a light controller for detecting a sum of the light intensities of the correlation pattern obtained by the first optical correlator, adjusting the intensity of coherent light to be radiated on the first spatial light modulator and making substantially constant the sum of light intensities of the correlation pattern; and a light detector for detecting the position of a strongest optical peak of the correlation pattern appearing on the second spatial light modulator, using the light read out by the coherent light, and determining the correspondence of the input pattern to a reference pattern, wherein said first optical correlator further comprises a first lens, a second lens and a correlation filter stored with Fourier transforms of reference patterns, wherein said second optical correlator comprises a third lens, a fourth lens and a display filter stored with Fourier transforms of display patterns, wherein said reference array includes a plurality of reference patterns and stored with Fourier transforms thereof to form a reference filter, each reference pattern including a plurality of patterns representing a similar pattern category and a display pattern and forming a sub-group, the reference filter forming a bright correlation peak on a prescribed position on the input plane of the second spatial light modulator, and wherein said display array includes a display pattern for each pattern category and stored with Fourier transforms thereof to form a display filter, the display array converting each bright correlation peak formed by the correlation filter on the output plane of the second spatial light modulator to said display pattern included in the pattern category represented by the position of the correlation peak.

4. A pattern display apparatus comprising:

means for imaging an input pattern, such as a letter or picture, on a first spatial light modulator;

lighting means including a first light source for radiating coherent light and reading out the input pattern imaged on the first spatial light modulator;

a first optical correlator for obtaining a correlation pattern of the read-out pattern on the first spatial modulator and a reference array of a plurality of reference patterns;

a second spatial light modulator having a non-linear input-output response characteristic and putting out a difference among input values in magnification;

another lighting means including a second light source for radiating coherent light and reading out the non-linearly transformed correlation pattern on the second spatial light modulator;

a second optical correlator for correlating together a display array including a plurality of display patterns and the read-out correlation pattern from the second spatial light modulator;

feedback means for feeding back the light passed through the second optical correlator to the first optical correlator and mixing the fed-back light with the read-out light of the input pattern;

a light controller for detecting a sum of the light intensities of the correlation pattern obtained by the first optical correlator, adjusting the intensity of coherent light to be radiated on the first spatial light modulator and making substantially constant the sum of light intensities of the correlation pattern; and means for displaying the display pattern obtained through the second optical correlator, wherein said first optical correlator comprises a first lens, a second lens and a correlation filter stored with Fourier transforms of reference patterns, wherein said second optical correlator comprises a third lens, a fourth lens and a display filter stored with Fourier transforms of display patterns, wherein said reference array includes a plurality of reference patterns and stored with Fourier transforms thereof to form a reference filter, each reference pattern including a plurality of patterns representing a similar pattern category and a display pattern and forming a sub-group, the reference filter forming a bright correlation peak on a prescribed position on the input plane of the second spatial light modulator, and wherein said display array includes a display pattern for each pattern category and stored with Fourier transforms thereof to form a display filter, the display array converting each bright correlation peak formed by the correlation filter on the output plane of the second spatial light modulator to said display pattern included in the pattern category represented by the position of the correlation peak.

* * * * *